Patented Sept. 15, 1942

2,295,760

UNITED STATES PATENT OFFICE 2,295,760

PROCESS FOR SEPARATING ALDEHYDES AND KETONES

Richard S. Schreiber, Wilmington, Del., assignor to E. I. du Pont de Nemours & Company, Wilmington, Del., a corporation of Delaware No Drawing. Application August 11, 1939, Serial No. 289,585

15 Claims. (Cl. 260—609)

This invention relates to a process for the separation of aldehydes and ketones from mixtures containing same and also to a process for the separation and isolation of aldehydes and ketones from admixture with each other.

It is well known that under distillation conditions many aldehydes tend to coordinate with various compounds so that any attempt to separate the aldehyde by simple distillation is seriously complicated. An example of this type is a mixture of chloroacetaldehyde and water or alcohol. In either case the chloroacetaldehyde shows a strong tendency to form hydrates or alcoholates and on distillation yields a mixture of the hydrate and free aldehyde, each of which boils fairly closely to the other. This tendency for negatively substituted aldehydes and ketones to hydrate with solvents such as water and alcohol is quite general. It is also well known that formaldehyde, because of its peculiar properties, is difficult to separate by any simple means such as distillation or extraction. Furthermore it is recognized that negatively substituted aldehydes and ketones as well as dialdehydes in general are thermally unstable and that on distillation they readily decompose or polymerize so as to make their separation extremely difficult. This is particularly true in regard to the products described in the copending application of Hanford and Schreiber, Serial No. 226,730. It is therefore evident that prior processes for the separation of these aldehydes and ketones have in all cases been extremely difficult to accomplish and in many cases wholly impractical.

This invention has as an object the removal of aldehydes and ketones from mixtures containing same by a simple and practical procedure. Another object is to provide a simple and practical method for separating and isolating aldehydes and ketones as their mercaptal or mercaptol derivatives from admixture with each other. Still another object is the separation and isolation of various aldehydes from admixture with each other. Another object is to provide a simple process for the separation and isolation of various aldehydes from admixture with various ketones. Another object is the removal of formaldehyde from reaction mixtures in which it is present as such, under such mild conditions that the other components of the mixture will not be affected. Another object is to provide certain new and useful chemical compounds. Other objects will be apparent from a reading of the following description of the invention.

These objects are accomplished by the following invention which comprises reacting the aldehydes and ketones with thiols so as to form the corresponding mercaptals and mercaptols, said reaction being carried out in the presence of an acidic catalyst, then separating the desired mercaptals and mercaptols.

The following examples set forth certain well defined instances of the application of this invention. They are, however, not to be considered as limitations thereof since many modifications may be made without departing from the spirit and scope of this invention.

*Example I*

Three hundred grams of paraformaldehyde were suspended in 300 grams of water (50% $CH_2O$) and the mixture warmed to 80° C. when 2 cc. of a 10% sodium hydroxide solution was added to aid in depolymerizing the paraformaldehyde. The temperature of the reaction mixture was then raised to 99° C., when 66 cc. of a solution containing 26 grams of enediols was added. When the temperature again reached 99° C., 6 grams of lead oxide were added and 10% sodium hydroxide added at such a rate as to maintain a pH of 7 during the entire run. Immediately after the addition of the lead oxide catalyst, a vigorous reaction set in and external heating was discontinued. When 82% of the formaldehyde had condensed, further reaction was prevented by chilling the solution and adding 2 cc. of concentrated sulfuric acid dissolved in 10 cc. of water. The time required for attaining this degree of condensation was approximately 12 minutes. The amount of 10% sodium hydroxide added to maintain a pH of 7 was approximately 98 cc. The precipitated lead sulfate was removed by filtration and the filtrate made neutral to litmus with 10% sodium hydroxide.

To a 250 cc. portion of this polymerized formaldehyde solution, which contained 20 grams of formaldehyde and 80 grams of hydroxy aldehydes and ketones, was added 300 grams of ethyl thiol, and then during vigorous agitation, hydrogen chloride was passed into the solution maintaining a temperature of 10° to 15° C. until approximately 100 grams had been absorbed. The nonaqueous layer was then removed and the residue, after being neutralized with potassium carbonate, was extracted three times with 100 cc. portions of benzene which were combined with the nonaqueous layer mentioned above. This material was dried with potassium carbonate and, after the removal of the benzene, fractionally distilled at reduced pressure to yield the following results:

| Fraction | Compound | Grams | Boiling point |
|---|---|---|---|
| I | $CH_2(SC_2H_5)_2$ | 68.0 | 75–80° C. at 15 mm. |
| II | $CH_2OHCH(SC_2H_5)_2$ | 16.6 | 100–105° C. at 6 mm. |
| III | $CH_2OHCHOHCH(SC_2H_5)_2$ | 23.2 | 140–160° C. at 5 mm. |

Analysis—
Fraction II, $C_6H_{14}OS_2$—
  Calc'd.: C, 43.35; H, 8.43; S, 38.54
  Found: C, 42.94; H, 8.26; S, 38.66
Fraction III, $C_7H_{16}O_2S_2$—
  Calc'd.: C, 42.85; H, 8.16; S, 32.65
  Found: C, 42.94; H, 8.15; S, 31.79

Example II

An aliquot of formaldehyde solution that had been condensed in a manner analogous to that given in Example I, which contained 14 grams of formaldehyde and 79 grams of hydroxy aldehydes and ketones, was mixed with 250 grams of ethyl thiol and the solution saturated with hydrogen chloride at 15° to 20° C. At this point the solution, which was colored purplish red, was neutralized with solid potassium carbonate, still maintaining a temperature of 10° to 15° C. The non-aqueous layer was then removed, and the aqueous residue extracted three times with 200 cc. portions of ether which were combined with the main nonaqueous extract and dried over anhydrous potassium carbonate. After removal of the ether, the residue was fractionally distilled under reduced pressure to yield the following products:

| Fraction | Compound | Grams | Boiling point |
|---|---|---|---|
| I | $CH_2(SC_2H_5)_2$ | 86.3 | 73–74° C. at 18 mm. |
| II | $CH_2OHCH(SC_2H_5)_2$ | 16.7 | 93–95° C. at 5 mm. |
| III | $CH_2OHCHOHCH(SC_2H_5)_2$ | 20.4 | 132–134° C. at 2 mm. |
| IV | $CH_2OHCHOHCHOHCH(SC_2H_5)_2$ | 17.0 | 160–200° C. at 2 mm. |

The analysis of fractions II and III gave results almost identical to those mentioned in Example I.

Example III

A 225 cc. sample of formaldehyde solution which has been condensed in a manner analogous to that described in Example I, and which contained 24 grams of formaldehyde and 76 grams of hydroxy aldehydes and ketones, was mixed with 200 grams of ethyl thiol and chilled in an ice bath to 10° C. Hydrogen chloride was then passed in until 35 grams had been absorbed. The nonaqueous layer was then removed and then an additional 140 grams of ethyl thiol were added and 35 grams more of hydrogen chloride passed into the reaction mixture. This operation was repeated a third time. After the removal of the third nonaqueous layer, the residue was neutralized with potassium carbonate and extracted three times with 100 cc. portions of ether which were combined with the third nonaqueous extract. Each extract was dried with anhydrous potassium carbonate and then distilled under reduced pressure after removal of the excess mercaptan and ether. Under these conditions, it was found that practically all the formaldehyde present was converted to its diethyl mercaptal very rapidly since practically all the formaldehyde diethyl mercaptal was found in extract 1 and only traces of this material were observed during the distillation of extracts 2 and 3. The combined results of these three extracts are given below:

| Fraction | Compound | Grams | Boiling point |
|---|---|---|---|
| I | $CH_2(SC_2H_5)_2$ | 82.1 | 73° C. at 18 mm. |
| II | $CH_2OHCH(SC_2H_5)_2$ | 5.7 | 93–98° C. at 5 mm. |
| III | $CH_2OHCHOHCH(SC_2H_5)_2$ | 16.0 | 130–134° C. at 2 mm. |

Example IV

A 223 cc. sample of formaldehyde solution which had been condensed in a manner analogous to that given in Example I, and which contained approximately 28 grams of formaldehyde and 72 grams of hydroxy aldehydes and ketones, was mixed with 300 grams of ethyl thiol. The mixture was cooled to 10° C. in an ice salt bath and then treated with 300 grams of concentrated sulfuric acid, never allowing the temperature to exceed 10° C. during this addition. After all of the sulfuric acid had been added, the nonaqueous layer was removed and replaced with an additional 100 grams of fresh ethyl thiol. After stirring for 30 minutes more at 10° C., the nonaqueous layer was separated and added to the first portion. This combined extract was dried with anhydrous potassium carbonate and then distilled under reduced pressure to yield 90 grams of the diethyl mercaptal of formaldehyde, B. P. 70° to 75° C. at 18 mm.

Example V

Thirty grams of pure glycolaldehyde were dissolved in 100 cc. of water and then mixed with 100 grams of ethyl thiol. After cooling to 10° C., hydrogen chloride was passed into the solution until approximately 25 grams had been absorbed. At this point an additional 100 cc. of ethyl thiol were added, and the mixture allowed to stand overnight at 5° C. The nonaqueous layer was then separated and the residue was extracted twice with 100 cc. portions of ether which were combined with the main nonaqueous material. After washing with 100 cc. of 5% sodium hydroxide solution and drying over anhydrous pottasium carbonate, this material was distilled under reduced pressure to yield 72.3 grams of glycolaldehydediethyl mercaptal, B. P. 112° to 113° C. at 8 mm. This represents an 87% yield based on the glycolaldehyde.

Analysis—
$C_6H_{14}OS_2$—
  Calc'd.: C, 43.35; H, 8.43; S, 38.54
  Found: C, 43.54; H, 8.20; S, 39.09

The process of this invention is applicable to any mixture of aldehydes and ketones, but is especially adapted to those mixtures which contain aldehydes and ketones not readily separated by the usual physical means. This method, for example, is applicable to mixtures of glycol aldehyde and glyceric aldehyde, glycol aldehyde and dihydroxyacetone, glycol aldehyde and chloroacetaldehyde, glyceric aldehyde and glucose, chloroacetaldehyde and acetaldehyde, bromoacetaldehyde and glycol aldehyde, methoxyacetaldehyde and acetone, and ethoxy acetaldehyde and glyceric aldehyde, methoxy acetone and glycol aldehyde, chloracetone and chloroacetaldehyde and bromoacetone and methoxyacetaldehyde.

Although any thiol can be used it is preferred to use those of a low molecular weight to obtain readily distillable compounds. Thiols such as methyl, ethyl, propyl, isopropyl, butyl, isobutyl, amyl isoamyl and stearyl can be employed in the process. Polythiols such as 1,2-ethane dithiol, 1,3-propanedithiol, 1,2,3-propane trithiol, 1,4-butane dithiol and 1,3-butane dithiol can also be used in this process.

As an acidic catalyst for use in this process there may be used any substance which in solution in a polar solvent gives an acidic reaction. This includes organic and inorganic acids, acid salts, and salts of relatively strong acids and weak bases. The preferred catalysts are hydrochloric, p-toluenesulfonic, and sulfuric acids.

The formation of these mercaptals and mercaptols may be carried out in either aqueous or nonaqueous media.

This invention is particularly useful for the removal of formaldehyde from reaction mixtures in which it is present, since it is well known that this material cannot be separated by any of the usual simple physical methods; e. g., extraction or distillation. This invention is applicable to the isolation of negatively substituted aldehydes and ketones, especially of hydroxy aldehydes and ketones which tend to undergo decomposition or polymerization when attempts are made to distill the free aldehyde or ketone.

This invention constitutes a considerable advance in the art since it offers a means of isolating thermally unstable aldehydes and ketones from reaction mixtures in which they are present. Furthermore, it also offers a means of removing formaldehyde from reaction mixtures under such mild conditions that the other components of the mixture are not affected. This invention is particularly advantageous in the isolation of glycol and glyceric aldehydes, which are produced by the condensation of formaldehyde. Attempts to isolate these substances by any method known previously have been totally unsuccessful, but by conversion of these extremely sensitive aldehydes to their corresponding mercaptals they can be readily separated from the reaction mixture, and distilled without decomposition. The free aldehydes and ketones are obtained from these mercaptals and mercaptols by methods known to the art; for example, by hydrolysis with dilute acid.

These compounds are useful as solvents for a wide variety of organic compounds, as plasticizers for polymeric materials, and as intermediates in the preparation of esters containing mercaptal groups.

It is apparent that many widely different embodiments of this invention may be made without departing from the spirit and scope thereof and therefore it is not intended to be limited except as indicated in the appended claims.

I claim:

1. A process for the separation and isolation of aldehydes and ketones which comprises reacting said aldehydes and ketones with an acyclic alkyl thiol in the presence of a substance which in solution in a polar solvent gives an acidic reaction so as to obtain the corresponding mercaptals and mercaptols, and separating the desired mercaptals from the mercaptols.

2. The process in accordance with claim 1 characterized in that the acyclic alkyl thiol is a low molecular weight thiol.

3. A process for the separation and isolation of aldehydes and ketones which tend to undergo decomposition or polymerization when distilled, which comprises reacting said aldehydes and ketones with an acyclic alkyl thiol in the presence of a substance which in solution in a polar solvent gives an acidic reaction so as to obtain the corresponding mercaptals and mercaptols, and separating the desired mercaptals from the mercaptols.

4. A process for the separation and isolation of negatively substituted aldehydes and ketones which comprises reacting said aldehydes and ketones with an acyclic alkyl thiol in the presence of a substance which in solution in a polar solvent gives an acidic reaction so as to obtain the corresponding mercaptals and mercaptols, and separating the desired mercaptals from the mercaptols.

5. A process for the separation and isolation of hydroxy-substituted aldehydes and ketones which tend to undergo decomposition or polymerization when distilled, which comprises reacting said aldehydes and ketones with an acyclic alkyl thiol in the presence of a substance which in solution in a polar solvent gives an acidic reaction so as to obtain the corresponding mercaptals and mercaptols, and separating the desired mercaptals from the mercaptols.

6. A process for the removal of formaldehyde from reaction mixtures under such mild conditions that the other components of the mixtures will not be affected, which comprises reacting said formaldehyde with an acyclic alkyl thiol in the presence of a substance which in solution in a polar solvent gives an acidic reaction at a temperature below 10° C. so as to obtain the mercaptal corresponding to formaldehyde, and separating said mercaptal from the reaction mixture.

7. A process for the isolation of glycol aldehydes and glyceric aldehydes that are producible by the condensation of formaldehyde which comprises reacting said aldehydes with an acyclic alkyl thiol in the presence of a substance which in solution in a polar solvent gives an acidic reaction so as to obtain the corresponding mercaptals and mercaptols, and separating the mercaptals and mercaptols.

8. Diethyl mercaptal of glyceric aldehyde.

9. Diethl mercaptal of tetrose.

10. A compound of the formula $$HOCH_2CH(SC_2H_5)_2$$

11. A compound of the formula $$HOCH_2(CHOH)_xC(SR)_2(CHOH)_yH$$

wherein $x$ is a numerical value selected from the group consisting of 0, 1 and 2, $y$ is a numerical value selected from the group consisting of 0, 1 and 2, and R is an alykl radical.

12. A compound of the formula $$HOCH_2(CHOH)_xCH(SR)_2$$

wherein $x$ is a numerical value selected from the group consisting of 0, 1 and 2 and R is an alkyl radical.

13. A process for the separation and isolation of aldehydes and ketones which comprises reacting said aldehydes and ketones with an acylic alkyl thiol in the presence of hydrochloric acid so as to obtain the corresponding mercaptals and mercaptols, and separating the desired mercaptals from the mercaptols.

14. A process for the separation and isolation of aldehydes and ketones which comprises reacting said aldehydes and ketones with an acyclic alkyl thiol in the presence of paratoluene sulfonic acid so as to obtain the corresponding mercaptals and mercaptols, and separating the desired mercaptals from the mercaptols.

15. A process for the separation and isolation of aldehydes and ketones which comprises reacting said aldehydes and ketones with an acyclic alkyl thiol in the presence of sulfuric acid so as to obtain the corresponding mercaptals and mercaptols, and separating the desired mercaptals from the mercaptols.

RICHARD S. SCHREIBER.